United States Patent
Fukushige et al.

(10) Patent No.: US 10,997,862 B2
(45) Date of Patent: May 4, 2021

(54) VEHICLE TRAVEL CONTROL METHOD AND VEHICLE TRAVEL CONTROL DEVICE

(71) Applicant: Nissan Motor Co., Ltd., Yokohama (JP)

(72) Inventors: Takashi Fukushige, Kanagawa (JP); Satoshi Tange, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 227 days.

(21) Appl. No.: 16/323,385

(22) PCT Filed: Sep. 5, 2016

(86) PCT No.: PCT/JP2016/076036
§ 371 (c)(1),
(2) Date: Feb. 5, 2019

(87) PCT Pub. No.: WO2018/042671
PCT Pub. Date: Mar. 8, 2018

(65) Prior Publication Data
US 2020/0388157 A1   Dec. 10, 2020

(51) Int. Cl.
*G08G 1/16*  (2006.01)
*B60W 30/165*  (2020.01)
*B60W 30/10*  (2006.01)
*B60W 40/072*  (2012.01)

(52) U.S. Cl.
CPC ............ *G08G 1/166* (2013.01); *B60W 30/10* (2013.01); *B60W 30/165* (2013.01); *B60W 40/072* (2013.01); *G08G 1/167* (2013.01)

(58) Field of Classification Search
CPC combination set(s) only.
See application file for complete search history.

(56) References Cited

U.S. PATENT DOCUMENTS

| | | | |
|---|---|---|---|
| 2005/0090950 A1* | 4/2005 | Sawamoto | G08G 1/166 701/23 |
| 2014/0180569 A1* | 6/2014 | Ueda | B62D 15/025 701/400 |
| 2016/0339914 A1* | 11/2016 | Habu | B60W 30/12 |

FOREIGN PATENT DOCUMENTS

| | | |
|---|---|---|
| CN | 104442823 A | 3/2015 |
| CN | 105015547 A | 11/2015 |
| DE | 10 2012 005 272 A1 | 10/2012 |
| EP | 2 857 288 A1 | 4/2015 |
| JP | 2007-176290 A | 7/2007 |
| JP | 2008-027309 A | 2/2008 |
| JP | 2008-117073 A | 5/2008 |

(Continued)

*Primary Examiner* — Kevin P Mahne
(74) *Attorney, Agent, or Firm* — Global IP Counselors, LLP (57) ABSTRACT

A vehicle travel control method is provided for controlling a host vehicle so as to follow a preceding vehicle. A first area where the host vehicle can possibly travel is calculated from a travel trajectory of the new preceding vehicle upon detecting a new preceding vehicle cutting in between the preceding vehicle and the host vehicle. A second area is set to a previous travelable area of the host vehicle that was determined up to a previous time. The first area and the second area are added to define a defined travelable area. A target travel trajectory of the host vehicle is generated within the defined travelable area. The host vehicle is controlled along the generated target travel trajectory.

10 Claims, 9 Drawing Sheets

(56) References Cited

FOREIGN PATENT DOCUMENTS

| | | |
|---|---|---|
| JP | 2013-126854 A | 6/2013 |
| JP | 2015-191553 A | 11/2015 |
| JP | 6154348 B2 | 6/2017 |

\* cited by examiner

VEHICLE TRAVEL CONTROL METHOD AND VEHICLE TRAVEL CONTROL DEVICE

CROSS-REFERENCE TO RELATED APPLICATIONS

This application is a U.S. national stage application of International Application No. PCT/JP2016/076036, filed on Sep. 5, 2016.

BACKGROUND

Technical Field

The present disclosure relates to a vehicle travel control method and a vehicle travel control device for controlling a host vehicle so as to follow a preceding vehicle.

Background Information

When a host vehicle is controlled so as to follow a preceding vehicle, if the preceding vehicle to be followed changes over due to a lane change or another vehicle cutting in, the control target value changes significantly, and there is the risk of the vehicle behavior becoming unstable.

Accordingly, in the technique disclosed in Patent Document 1 (Japanese Laid-Open Patent Application No. 2007-176290), when a changeover of the preceding vehicle is detected, the gain that is used for feedback control for following the preceding vehicle is temporarily reduced in order to suppress the vehicle behavior from changing significantly.

SUMMARY

In the case of the technique disclosed in Patent Document 1, although it is possible to suppress the vehicle behavior from changing significantly, the ability to follow the preceding vehicle decreases. As a result, for example, if a cut-in occurs during travel on a curved path and the preceding vehicle changes over, the host vehicle cannot appropriately follow the preceding vehicle that is traveling on the curved path, and there is the risk that the host vehicle will deviate from the lane of travel.

Therefore, an object of the present disclosure is to realize a vehicle travel control with which it is possible to suppress the vehicle behavior from changing significantly and to ensure the ability to follow the preceding vehicle, when the preceding vehicle changes over.

In order to realize the object described above, in the present disclosure, the following process is executed upon detecting a new preceding vehicle cutting in between the preceding vehicle and the host vehicle. That is, a first area where the host vehicle can possible travel is calculated from a travel trajectory of the new preceding vehicle; a travelable area of the host vehicle up to a previous time is set as a second area; and the first area and the second area are added to define the travelable area. Moreover, a target travel trajectory of the host vehicle is generated in the defined travelable area, and the host vehicle is controlled along the generated target travel trajectory.

As a result, it is possible to suppress the vehicle behavior from changing significantly, even when the preceding vehicle changes over. It is also possible to ensure the ability to follow the preceding vehicle.

DETAILED DESCRIPTION OF THE EMBODIMENTS

An embodiment for realizing a vehicle travel control method and a vehicle travel control device according to the present disclosure will be described below based on the embodiments illustrated in the drawings.

First Embodiment

Figure 1:
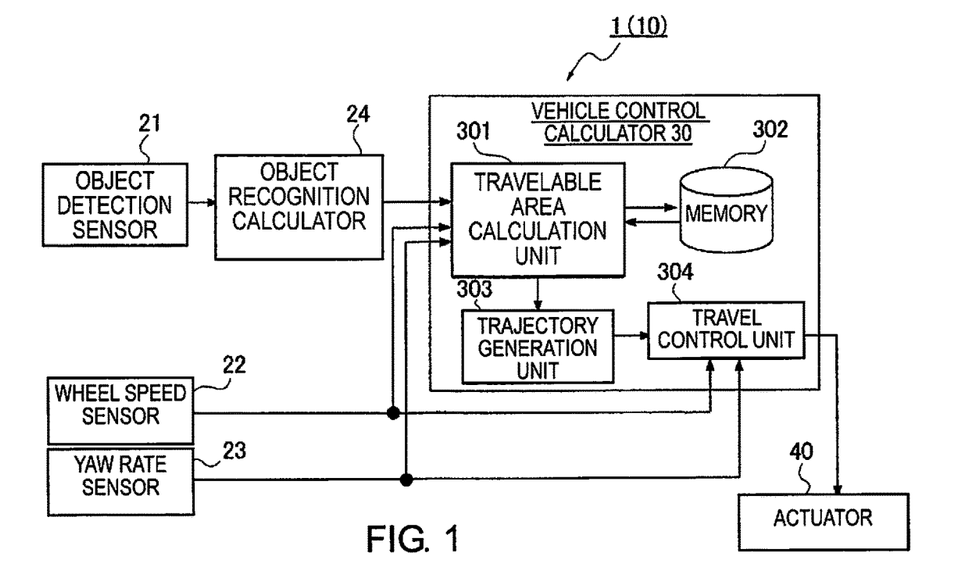
FIG. 1 is a block diagram illustrating a schematic overview of a vehicle travel control system to which is applied a vehicle travel control method and a vehicle travel control device according to a first embodiment.

FIG. 1 is a block diagram schematically illustrating a vehicle travel control system 1 according to the first embodiment. The vehicle travel control system 1 shown in FIG. 1 comprises an object detection sensor 21, a wheel speed sensor 22, a yaw rate sensor 23, an object recognition calculator 24, a vehicle control calculator 30, and an actuator 40. The vehicle travel control system 1 is a system that is mounted on a host vehicle 10.

The object detection sensor 21 detects the presence/absence of an obstacle or a preceding vehicle that is present in the vicinity of the host vehicle 10. The object detection sensor 21 is composed of a scanning laser radar, a millimeter wave radar, or the like.

The wheel speed sensor 22 is provided on the left and right driven wheels of the host vehicle 10 and detects the rotational speed of the driven wheels. The rotational speed detected by the wheel speed sensor 22 is used for calculating the vehicle speed and the direction of travel of the host vehicle 10. In addition, the yaw rate sensor 23 detects rotational angular velocity of the host vehicle 10. The rotational angular velocity detected by the yaw rate sensor 23 is used for calculating the bearing of the host vehicle 10.

The object recognition calculator 24 detects the position of an object detected by the object detection sensor 21 and determines whether the detected object is a preceding vehicle based on the size of the object, the relative speed with respect to the host vehicle 10, and the like. During detection of a preceding vehicle, the object recognition calculator also labels the preceding vehicle. Thus, it is possible detect a changeover of the preceding vehicle when a different vehicle cuts in between the preceding vehicle and the host vehicle 10, or when the preceding vehicle changes lanes. The object recognition calculator 24 calculates the vehicle speed of the detected preceding vehicle, as well as an inter-vehicular distance between the preceding vehicle and the host vehicle 10 in order to realize the preceding vehicle following control.

The vehicle control calculator 30 comprises a travelable area calculation unit 301, a memory 302, a trajectory generation unit 303, and a travel control unit 304. The travelable area calculation unit 301 calculates an area where the host vehicle 10 can possibly travel based on the calculation result of the object recognition calculator 24 and the detection results of the wheel speed sensor 22 and the yaw rate sensor 23.

The travelable area calculated by the travelable area calculation unit 301 is stored in the memory 302 and transmitted to the trajectory generation unit 303. The trajectory generation unit 303 generates a target travel trajectory T of the host vehicle 10 within the received travelable area.

The target travel trajectory T generated by the trajectory generation unit 303 is transmitted to the travel control unit 304. The travel control unit 304 calculate the respective control amount for steering, accelerator, brake, etc. (none shown), such that the host vehicle 10 can travel along the received target travel trajectory T. In addition, the travel control unit drives the actuator 40 based on the calculated control amounts. Although not shown, the actuator 40 is composed of a steering actuator, a drive actuator, a braking actuator, and the like.

Figure 2:
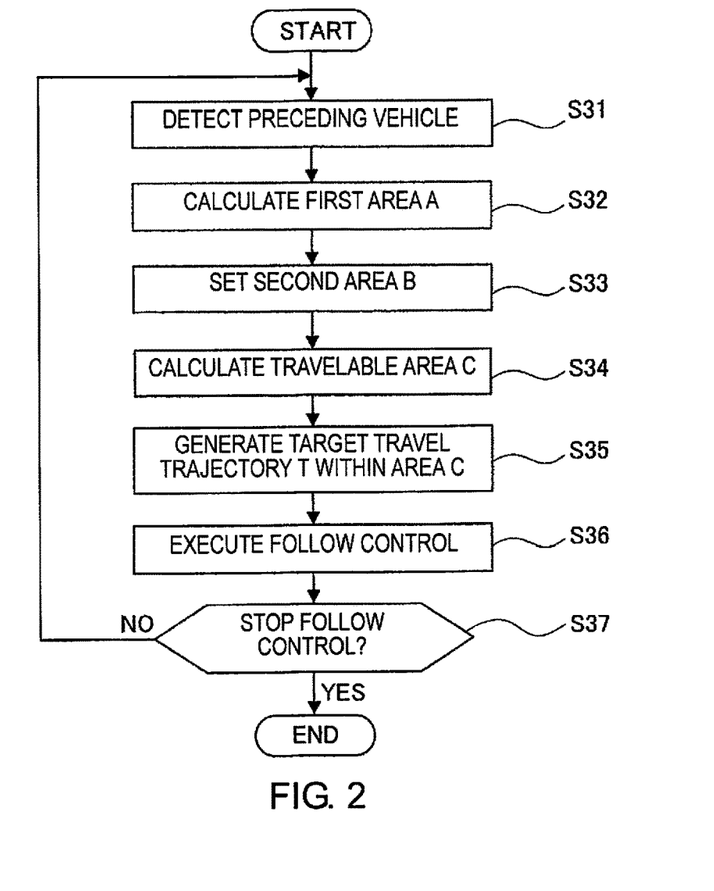
FIG. 2 is a flow chart illustrating a vehicle travel control process of the first embodiment that is executed by a vehicle control calculator.

FIG. 2 is a flow chart illustrating a vehicle travel control process of the first embodiment that is executed by the vehicle control calculator 30 (more precisely, by a processor incorporated in the vehicle control calculator 30). The flow chart illustrated in FIG. 2 is executed when a start condition for the preceding vehicle following control is satisfied. Whether the start condition for the preceding vehicle following control has been satisfied is determined when the preceding vehicle is present and, for example, based on an ON/OFF state of an execution switch for the preceding vehicle following control that is provided in the driver's seat of the host vehicle 10, or on a traffic condition.

First, in Step S31, the preceding vehicle is detected by means of the object detection sensor 21 and the object recognition calculator 24.

In Step S32, the travelable area calculation unit 301 calculates the travelable area present between the host vehicle 10 and the preceding vehicle detected in Step S31 as a first area A. Specifically, the travel trajectory on which the preceding vehicle actually travels between the current position of the host vehicle and the current position of the preceding vehicle is calculated as the first area A. This is because the area based on the trajectory on which the preceding vehicle has already traveled also can be determined as travelable for the host vehicle 10. The first area may be the travel trajectory itself (that is, corresponding only to the width of the preceding vehicle), an area in which the travel trajectory is expanded to the width of the travel lane, or be set to an intermediate width therebetween.

In Step S33, the travelable area calculation unit 301 sets the travelable area calculated up to a previous time as a second area B. That is, the entire area that is determined to be travelable in a process loop immediately before the current process loop is read from the memory 302 and is set as the second area B described above.

In addition, in the process of Step S33 of the first embodiment, the first and second areas, etc., are calculated based on relative coordinates with the host vehicle 10 as the origin. Thus, in Step S33, when the travelable area of the host vehicle 10 up to the previous time is set as the second area B, a coordinate transform that corresponds to the movement amount and movement direction of the host vehicle 10 between the previous time and the current time is carried out.

The coordinate transform described above can be carried out by calculating the movement amount and the movement direction of the host vehicle 10 by means of dead reckoning from the outputs of the wheel speed sensor 22 and the yaw rate sensor 23. Alternatively, the coordinate transform may be carried out by calculating the movement amount and the movement direction of the host vehicle 10 by means of odometry from the output of the wheel speed sensor 22.

Next, in Step S34, the first area A calculated in Step S32 and the second area B calculated in Step S33 are added to calculate the travelable area C. That is, the travelable area C indicates the entire area that can be determined as currently travelable. The calculation result of Step S34 is stored in the memory 302 and used when the second area B is set in the subsequent process loop.

In Step S35, the trajectory generation unit 303 generates the target travel trajectory T of the host vehicle 10 in a central region within the travelable area C calculated in Step S34. In the present disclosure, the central region refers to a region obtained by expanding a center line of the travelable area C by a prescribed amount (for example, by half the vehicle width of the host vehicle 10).

In Step S36, a follow control that controls the travel of the host vehicle 10 along the target travel trajectory T generated in Step S35 is carried out. Specifically, as described above, the travel control unit 304 calculates the control amounts, such as the steering, in accordance with the target travel trajectory T and drives the actuator 40 based on the calculated control amounts to thereby achieve the follow control.

Next, in Step S37, it is determined whether the follow control should be stopped. If the result is negative, the process returns to Step S31 and repeats the process described above. If the result is affirmative, the present vehicle travel control process is ended. Whether the follow control should be stopped is determined based on whether the start condition for the preceding vehicle following control is satisfied.

If a changeover of the preceding vehicle occurs during execution of the flow chart of FIG. 2, it is detected that a changeover of the preceding vehicle occurred by the object recognition calculator 24 in Step S31, and, in the subsequent Step S32, the first area A is calculated based on the new preceding vehicle.

The processing of the travelable area calculation unit 301 described above (Steps S32 to S34) will be described with reference to FIGS. 3 and 4.

Figure 3:
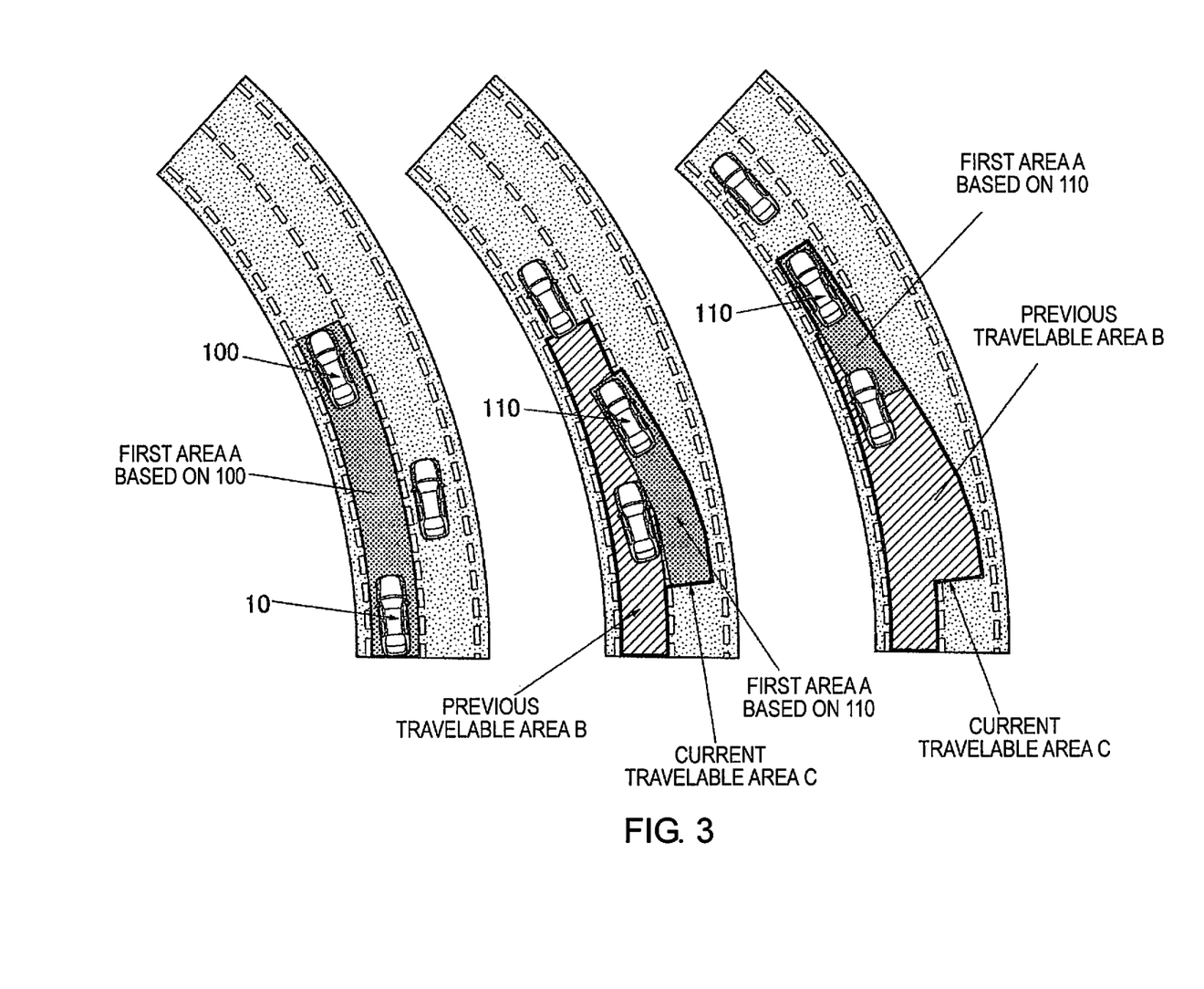
FIG. 3 is an explanatory view for explaining a travelable area calculation process of the first embodiment.

FIG. 3 illustrates the situation around the time that a cut-in of a preceding vehicle occurs, arranged in chronological order. Before the cut-in of a preceding vehicle occurs (FIG. 3, left), the travelable area calculation unit 301 calculates the first area A based on the travel trajectory of the current preceding vehicle 100. If there is a travelable area that was calculated in the previous process loop, said travelable area is set as the second area B, and the first area A and the second area B are added to calculate the current travelable area C. Since the situation shown on the left side of FIG. 3 indicates the first process of executing the flow chart of FIG. 2, the second area B is not present. Therefore, the first area A becomes the current travelable area C.

Thereafter, if another vehicle (new preceding vehicle 110) cuts in between the host vehicle 10 and the preceding vehicle 100 (FIG. 3, middle), the travelable area calculation unit 301 calculates a new first area A based on the travel trajectory of the new preceding vehicle 110. In addition, the travelable area calculation unit 301 sets the area that was the travelable area of the host vehicle 10 up to the previous time, calculated based on the travel trajectory of the preceding vehicle 100, as the second area B, and adds the first area A and the second area B to calculate the current travelable area C.

In the subsequent process loop (FIG. 3, right), the travelable area calculation unit 301 similarly calculates the first area A based on the current position of the new preceding vehicle 110 and the travel trajectory thereof, sets the previous travelable area as the second area B, and adds the first area A and the second area B to calculate the current travelable area C.

As described above, in this embodiment, when the preceding vehicle 100 is changed over to the new preceding vehicle 110, the current travelable area C is set by taking into account the second area B, which is the previous travelable area. Accordingly, it is possible to suppress a large change in the travelable area C and to suppress the behavior of the host vehicle 10 from changing significantly, even when the preceding vehicle changes over. Moreover, since the gain in the follow control is not changed, the ability to follow the preceding vehicle does not decrease.

Figure 4:
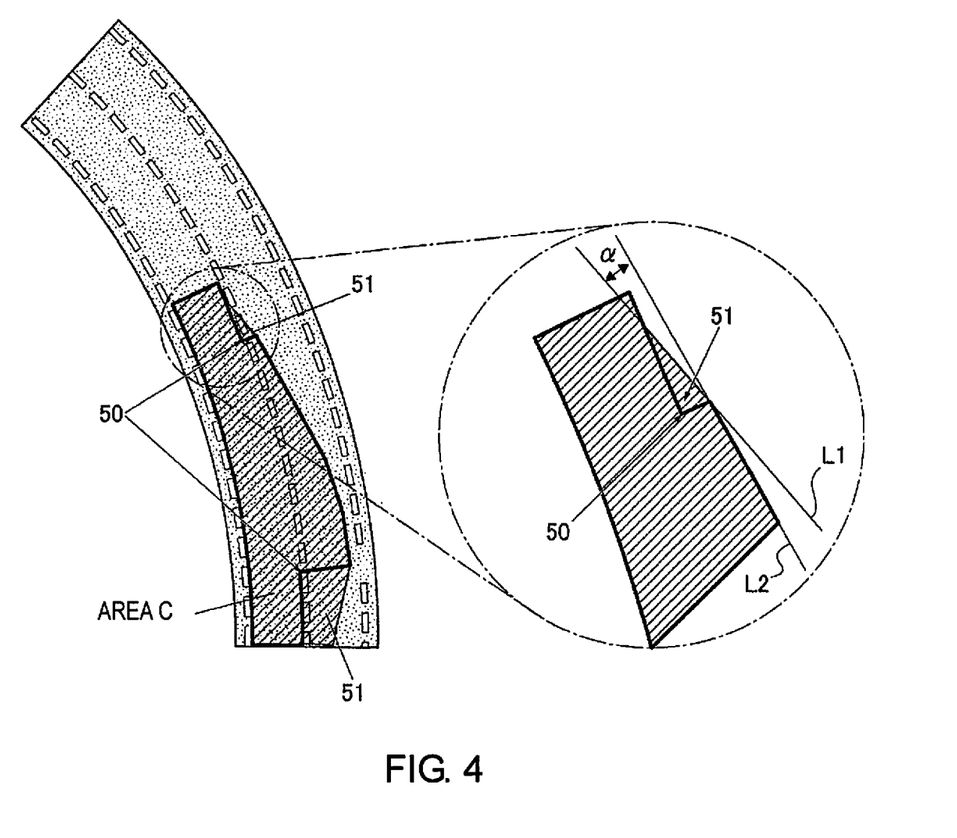
FIG. 4 is an explanatory view for explaining a modified example of the travelable area calculation process of the first embodiment.

FIG. 4 illustrates a modified example of a case in which the current travelable area C is calculated. In the modified example shown in FIG. 4, the steps (inner corner portions 50) that are generated when the first area A and the second area B are added are compensated for. Here, in the compensated travelable area C, the angle α formed between a boundary line L1, which is formed by a compensating portion 51, and a boundary line L2, which is adjacent to the compensating portion 51, is set to become shallower as the vehicle speed of the host vehicle 10 increases.

The compensation process described above can be executed for all the steps (inner corner portions 50) that are generated when the first area A and the second area B are added, as illustrated in FIG. 4, but are executed at least with respect to the steps that are present in the direction of travel of the host vehicle 10.

By compensating for the steps (inner corner portions 50) of the travelable area C, as in this modified example, the target travel trajectory T of the host vehicle 10 generated within the travelable area C can be made smoother.

Also, the discomfort experienced by the passenger when the target travel trajectory T shifts in the lateral direction increases as the vehicle speed of the host vehicle 10 increases. Thus, it is possible to reduce the amount of shift of the target travel trajectory T in the lateral direction, and to thereby reduce the discomfort described above, by setting the above-described angle α smaller as the vehicle speed of the host vehicle 10 increases.

Figure 5:
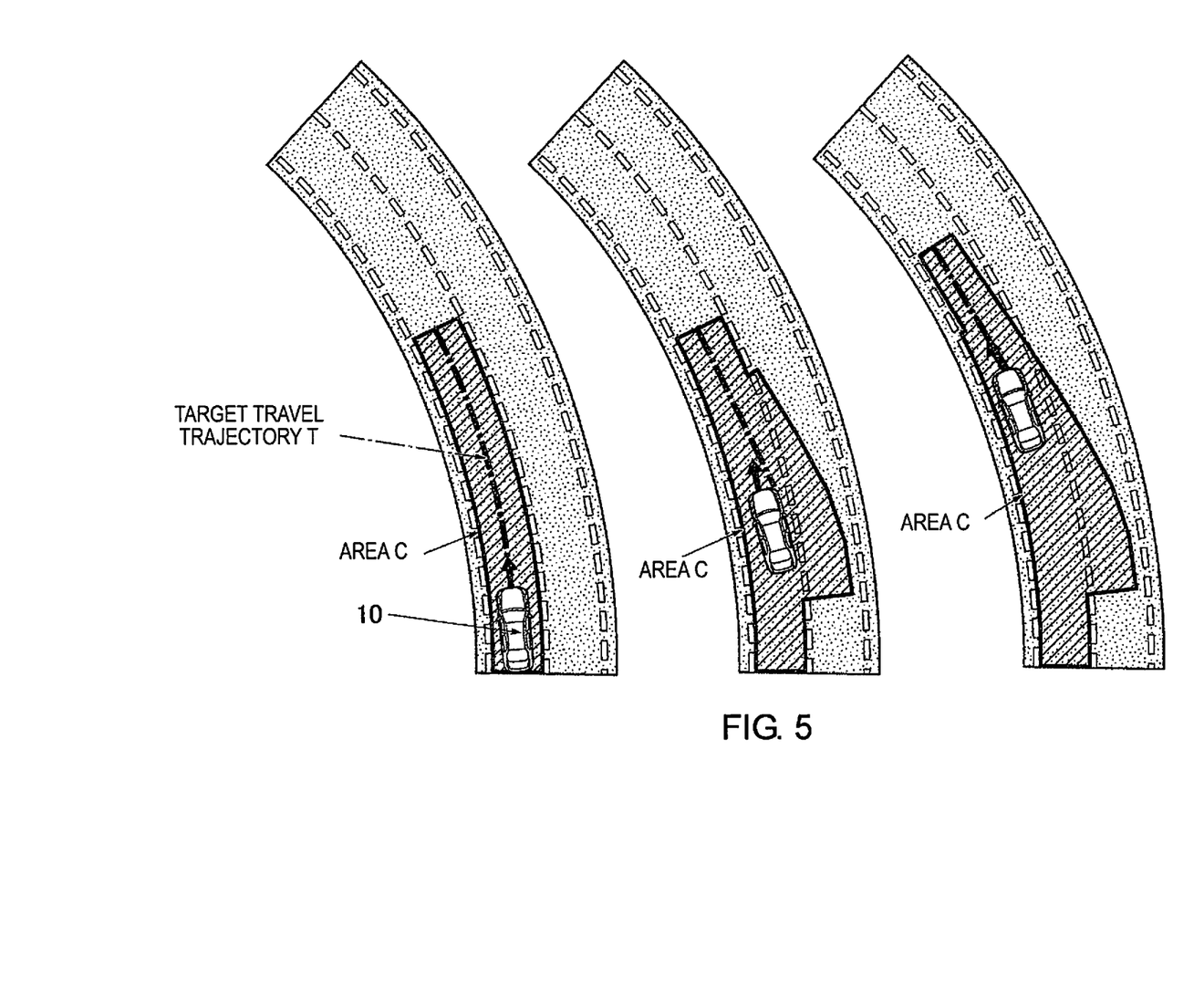
FIG. 5 is an explanatory view for explaining a travel trajectory generation process of the first embodiment.

Next, a trajectory generation process executed by the trajectory generation unit 303 described above will be described with reference to FIGS. 5 to 7. FIG. 5 shows the same situation as that shown in FIG. 3.

Figure 6:
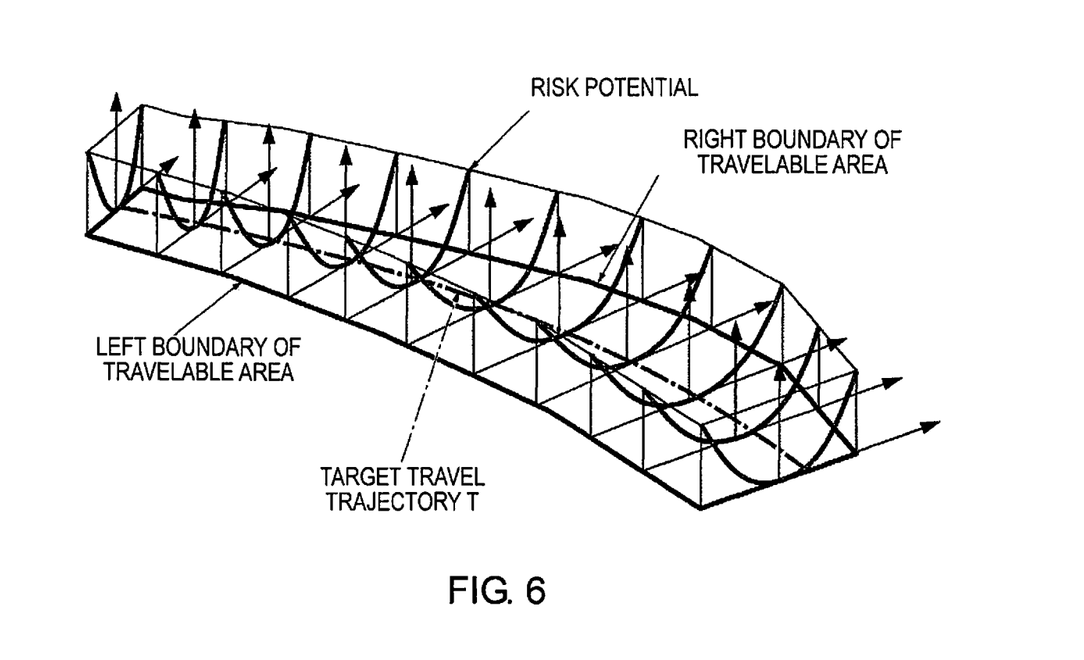
FIG. 6 is an explanatory view for explaining a travel trajectory generation process of the first embodiment.

The trajectory generation unit 303 generates the target travel trajectory T in the central region of the travelable area C at that point in time, as illustrated in FIG. 5. Specifically, a risk potential of the host vehicle 10 with respect to obstacles is defined for each point within the travelable area C, and the travel trajectory for which this risk potential becomes the minimum value is set as the target travel trajectory T, as illustrated in FIGS. 6 and 7.

For example, if the risk potential is defined using a quadratic function, the risk potential value at the left and right boundaries of the travelable area C is set to 1 (maximum value), and the risk potential value at the center of the travelable area C with respect to the vehicle width direction is set to 0 (minimum value). The trajectory generation unit 303 takes into consideration all of the risk potentials for each point within the travelable area C and determines the trajectory for which the sum of the risk potential values becomes smallest by means of a known optimization algorithm (for example, a least squares method).

Figure 7:
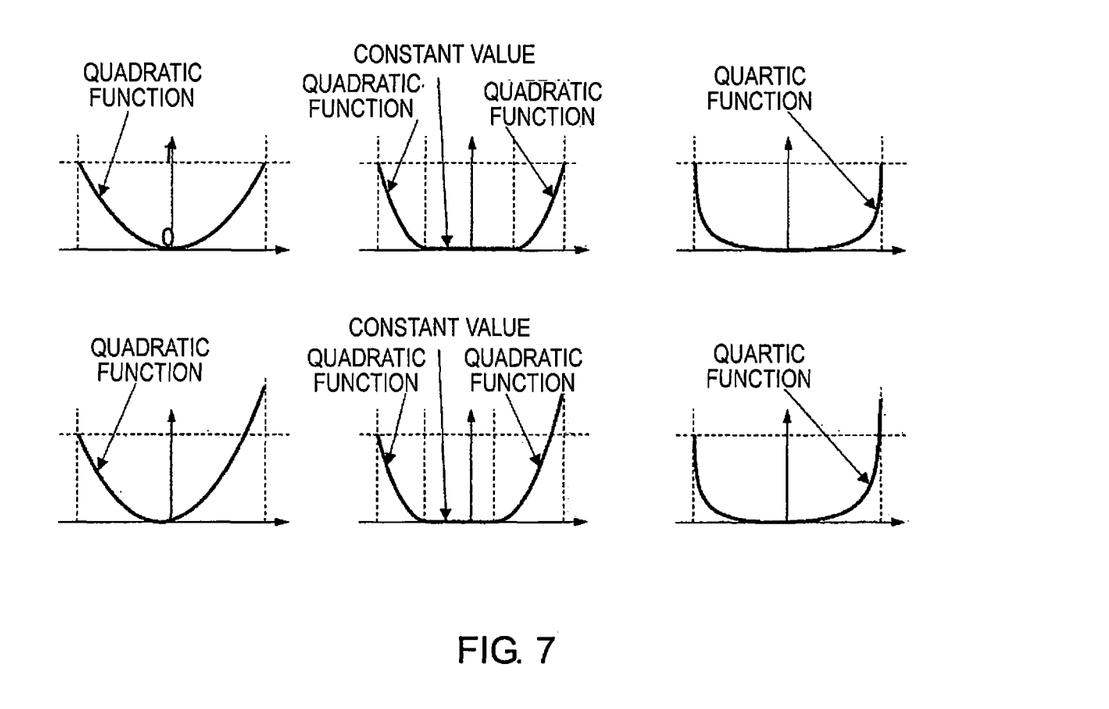
FIG. 7 is an explanatory view for explaining a modified example of the travel trajectory generation process of the first embodiment.

The risk potential is not limited to being defined by a quadratic function, but may also be defined by a quartic function, as is illustrated in FIG. 7. In addition, the risk potential value may be set to the minimum value (constant value) when within a set range from the center of the travelable area C with respect to the vehicle width direction. Moreover, it is not necessary for the function defining the risk potential to be symmetrical; the value of the risk potential may be different between left and right depending on the travel path of the host vehicle 10. For example, when the host vehicle 10 is traveling in the leftmost lane of a three-lane road with respect to the direction of travel, the risk that the host vehicle 10 will deviate from the road can be reduced by setting the risk potential value on the left side higher.

Figure 8:
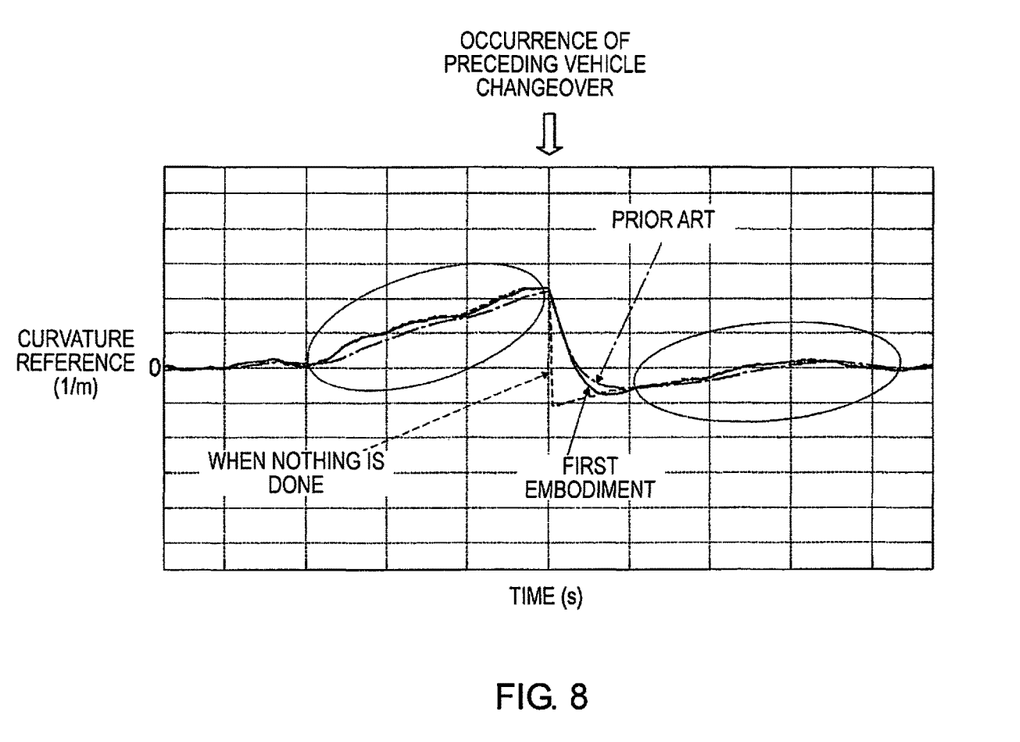
FIG. 8 is an explanatory view illustrating an effect of the vehicle travel control of the first embodiment.

Next, a quantitative effect of the vehicle travel control according to the first embodiment will be described with reference to FIG. 8. In FIG. 8, the vertical axis represents the curvature of the travel trajectory of the host vehicle 10, and the horizontal axis represents time. The behavior when the vehicle travel control of the first embodiment is executed is indicated by the solid line, the behavior when a normal follow control is executed as is indicated by the broken line, and the behavior when the control disclosed in Patent Document 1 is executed is indicated by the one-dotted chain line.

As described above, according to the control disclosed in Patent Document 1, because the gain of the follow control is set low, it is possible to suppress the vehicle behavior from changing significantly when the preceding vehicle changes over. However, as indicated by the circled portion in FIG. 8, the responsiveness decreases relative to the normal follow control. In contrast, when the vehicle travel control according to the first embodiment is executed, a reduction in the responsiveness as seen above does not occur. Moreover, as with the technique disclosed in Patent Document 1, it is possible to suppress the behavior of the host vehicle 10 from changing significantly when the preceding vehicle changes over.

Figure 9:
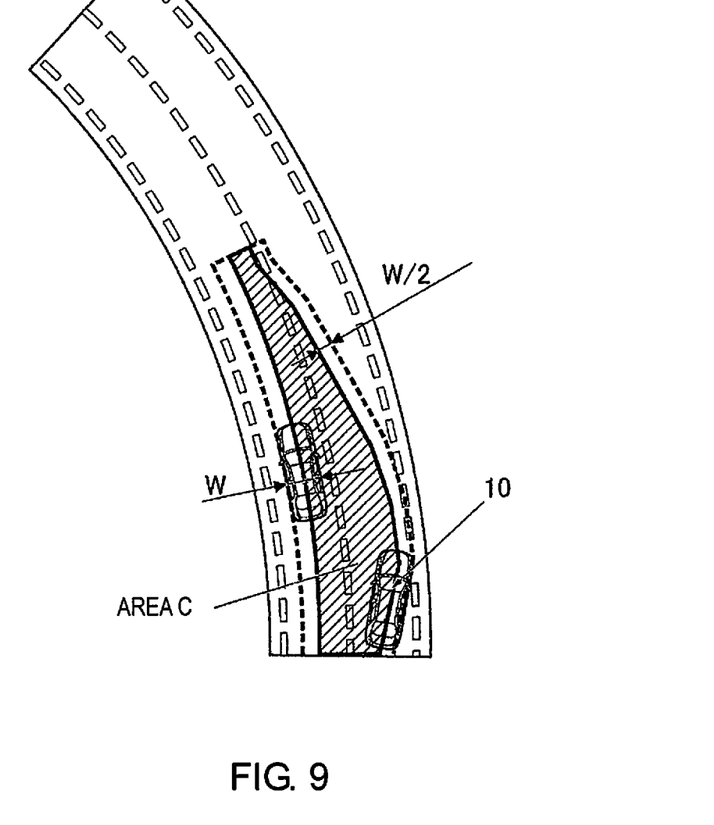
FIG. 9 is an explanatory view for explaining another modified example of the travelable area calculation process of the first embodiment.

FIG. 9 is an explanatory view for explaining another modified example of the travelable area calculation process according to the first embodiment. In this modified example, after the current travelable area C is calculated, the vehicle width direction of the travelable area C is reduced in size by half (W/2) of the vehicle width W of the host vehicle 10 from each of the left and right boundaries.

That is, when the target travel trajectory T is generated, the target travel trajectory T is generated taking into consideration the vehicle width W of the host vehicle 10 such that the host vehicle 10 can reliably travel within the travelable area C. In other words, the target travel trajectory T should not be generated within the range of half (W/2) of the vehicle width from the left and right boundaries of the travelable area C. Therefore, in this modified example, when the target travel trajectory T is generated, the areas corresponding to half (W/2) of the vehicle width W of the host vehicle 10 from the left and right boundaries of the travelable area C in the vehicle width direction are deleted in advance. As a result, it is possible to reduce the calculation processing load on the trajectory generation unit 303.

The effects listed below can be obtained with the vehicle travel control method and the vehicle travel control device according to the first embodiment described above.

(1) A vehicle travel control method for controlling a host vehicle 10 so as to follow a preceding vehicle 100 comprises: calculating a first area A where the host vehicle 10 can possibly travel from a travel trajectory of a new preceding vehicle 110 (Step S32), upon when detecting the new preceding vehicle 110 cutting in between the preceding vehicle 100 and the host vehicle 10 (Step S31); setting a travelable area of the host vehicle 10 up to a previous time as a second area B (Step S33); adding the first area A and the second area B to define the travelable area C (Step S34); generating a target travel trajectory T of the host vehicle 10 within the defined travelable area C (Step S35); and controlling the host vehicle 10 along the generated target travel trajectory T (Step S36).

That is, when the preceding vehicle 100 is changed over to the new preceding vehicle 110, the current travelable area C is set taking into account the second area B, which is the previous travelable area. Thus, it is possible to suppress a large change in the travelable area C and to suppress the behavior of the host vehicle 10 from changing significantly, even when the preceding vehicle changes over.

(2) In addition, the target travel trajectory T is generated in a central region within the travelable area C (Step S35, FIGS. 5 to 7). Therefore, in addition to the effect of (1), it is possible to generate a smooth target travel trajectory T.

(3) In addition, an inner corner portion 50 of the defined travelable area C is compensated by a compensating portion 51, and the target travel trajectory T is generated within the compensated travelable area C (Steps S34 to S35, FIG. 4). Therefore, it is possible to eliminate a step (inner corner portion 50) within the travelable area C and to generate a smoother target travel trajectory T.

(4) In addition, the compensation is set such that, in the compensated travelable area C, an angle α formed between a boundary line L1, which is formed by the compensating portion 51, and a boundary line L2, which is adjacent to the compensating portion 51, becomes smaller as the vehicle speed of the host vehicle 10 increases (Steps S34, FIG. 4). That is, since the discomfort that the passenger experiences with respect to a behavior in the lateral direction increases as the vehicle speed of the host vehicle 10 increases, the expansion of the travelable area C in the lateral direction due to the compensating portion 51 is configured to decrease as the vehicle speed of the host vehicle 10 increases. As a result, in addition to the effect of (3), it is possible to reduce the amount of shift of the target travel trajectory T in the lateral direction, and to thereby reduce the discomfort described above.

(5) In addition, a risk potential with respect to obstacles in the vicinity of the host vehicle 10 is defined based on boundaries in the travelable area C in the vehicle width direction of the host vehicle 10, and a path in which the defined risk potential becomes smallest is set as the target travel trajectory T (Step S35, FIGS. 6 and 7). Therefore, in addition to the effects of (1) to (4), it is possible to generate a smoother target travel trajectory T.

(6) In addition, the risk potential is defined using a quadratic function, the risk potential value at the boundaries in the vehicle width direction is set to 1, and the risk potential value at the center with respect to the vehicle width direction is set to 0 (Step S35, FIGS. 6 and 7). Therefore, in addition to the effect of (5), it is possible to more reliably prevent the host vehicle 10 from deviating from the travelable area C and to further simplify the calculation process for generating the target travel trajectory T.

(7) In addition, the risk potential is defined using a quadratic function, and a path with which the risk potential becomes smallest is determined based on the least squares method (Step S35, FIGS. 6 and 7). Therefore, in addition to the effects of (5) and (6), it becomes unnecessary to repeatedly carry out the calculation and a faster computation process can be realized.

(8) In addition, in a vehicle travel control device (the vehicle travel control system 1) that has a controller (the vehicle control calculator 30) that controls a host vehicle 10 along a target travel trajectory T generated so as to follow a preceding vehicle, the controller 30 comprises: a detection unit (the object detection sensor 21, the object recognition calculator 24) that detects whether a new preceding vehicle 110 cutting in has occurred between the preceding vehicle 100 and the host vehicle 10; a calculation unit that calculates a first area A where the host vehicle 10 can possibly travel from a travel trajectory of the new preceding vehicle 110; a setting unit (the travelable area calculation unit 301) that sets a travelable area up to a previous time as a second area B; an area defining unit (the travelable area calculation unit 301) for adding the first area A and the second area B to define the travelable area C (the travelable area calculation unit 301); and a generation unit (the trajectory generation unit 303) for generating a target travel trajectory T of the host vehicle 10 within the travelable area C.

That is, when the preceding vehicle 100 is changed over to the new preceding vehicle 110, the currently travelable area C is set taking into account the second area B, which is the previous travelable area. Therefore, it is possible to suppress a large change in the travelable area C and to suppress the behavior of the host vehicle 10 from changing significantly, even when the preceding vehicle changes over.

Second Embodiment

Next, the vehicle travel control method and the vehicle travel control device according to a second embodiment of the present invention will be described with reference to FIGS. 10 and 11. The vehicle travel control system according to the second embodiment has the same configuration as the vehicle travel control system 1 according to the first embodiment, so that a detailed description will be omitted.

Figure 10:
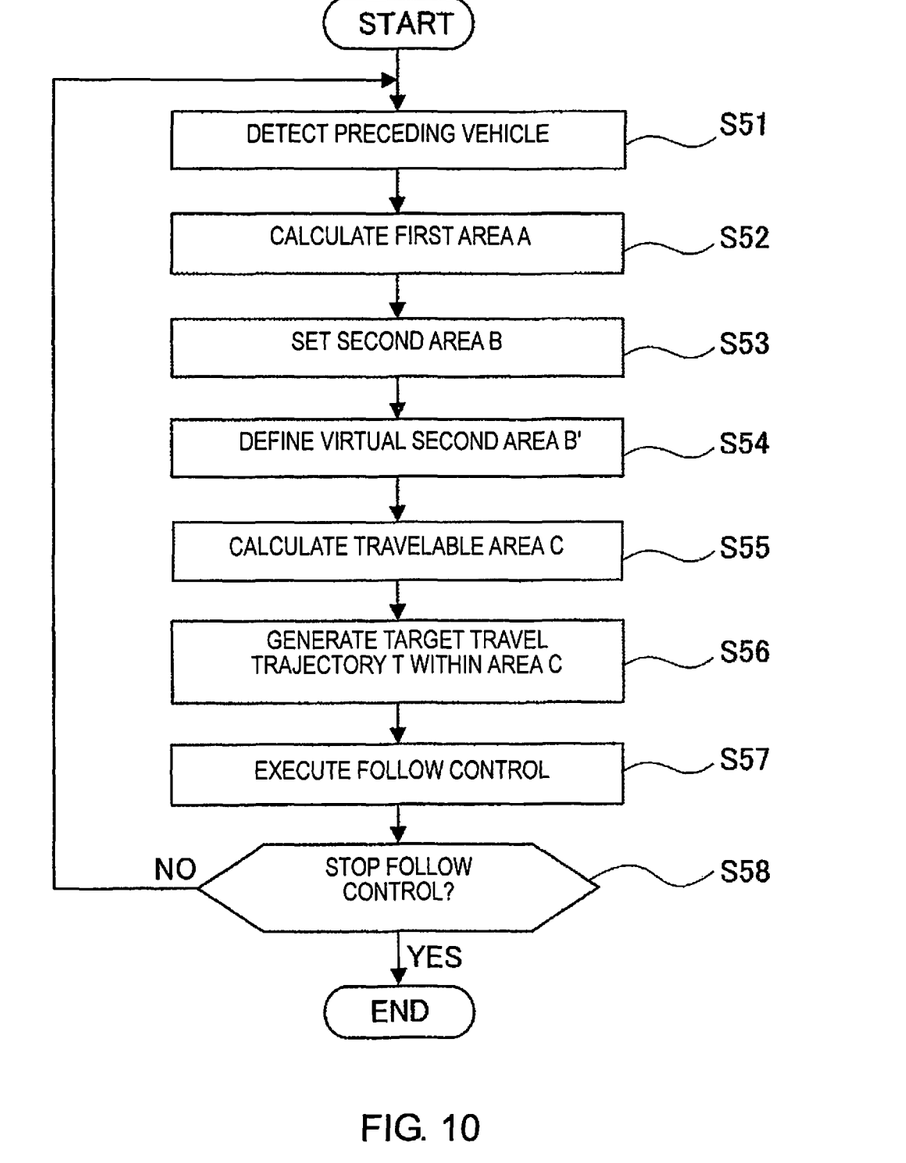
FIG. 10 is a flow chart illustrating the vehicle travel control process of a second embodiment that is executed by the vehicle control calculator.

FIG. 10 is a flow chart illustrating the vehicle travel control process of the second embodiment that is executed by the vehicle control calculator 30 according to the second embodiment. The flow chart illustrated in FIG. 10 is executed when a start condition for the preceding vehicle following control is satisfied, in the same manner as FIG. 2.

First, from Steps S51 to S53, the same process as that from Steps S31 to S33 in FIG. 2 is executed. Next, a virtual second area B' is defined in Step S54. Specifically, an area obtained by expanding the second area B set in Step S53 by a prescribed width in the vehicle width direction is defined as the virtual second area B'.

In Step S55, the current travelable area C is calculated based on the first area A calculated in Step S52, the second area B set in Step S53, and the virtual second area B' defined in Step S54. Specifically, only the area of the first area A that overlaps with the virtual second area B' (indicated as area A & B' in FIG. 11) is added to the second area B to set the current travelable area C, as illustrated in FIG. 11.

It suffices if the currently travelable area C can be ultimately set in the manner described above; thus, the process thereof is not limited to the foregoing. For example, the first area A and the second area B may be added first in the same manner as in the first embodiment, and an area of the first area A that does not overlap the virtual second area B' (area other than A & B') may be deleted.

In the subsequent Steps S56 to S58, the same process as that from Steps S35 to S37 in FIG. 2 is executed. In addition, the process described above is repeated as long as the result of Step S58 is negative.

Figure 11:
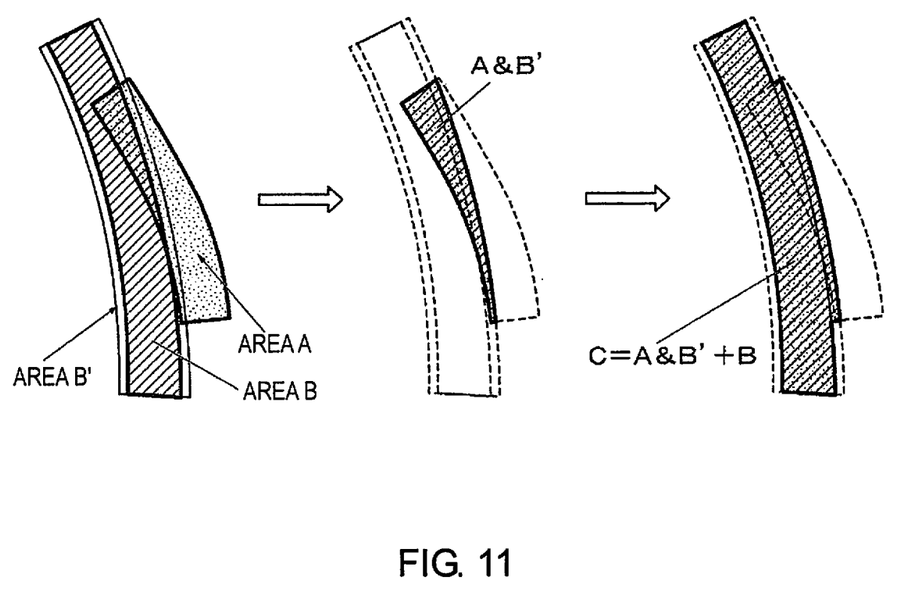
FIG. 11 is an explanatory view for explaining the travelable area calculation process of the second embodiment.

That is, in the case of the example shown in FIG. 11, in the subsequent process loop, the area indicated as area C in FIG. 11 is set as the second area B (Step S53), and an area obtained by expanding this area by a prescribed width is defined as the virtual second area B' (Step S54). Therefore, by repeatedly executing the process of FIG. 10, the same area as the travelable area C of the first embodiment, which was explained with reference to FIGS. 2, 3, etc., is ultimately generated as the travelable area C.

The effects listed below can be obtained with the vehicle travel control method and the vehicle travel control device according to the second embodiment.

(9) A virtual second area B' obtained by expanding the second area B in the vehicle width direction by a prescribed width is defined (Step S54), and only an area of the first area A that overlaps the virtual second area B' (area A & B') is added to the second area B to define the travelable area C (Step S55). That is, the currently travelable area C is not expanded by more than the prescribed width from the second area B', which is the previous travelable area. Accordingly, it is possible to further suppress a large change in the travelable area C, and thus to further suppress the behavior of the host vehicle 10 from changing significantly, even when the preceding vehicle changes over.

(10) In addition, the first area A and the second area B are added to define the travelable area C, a virtual second area B' obtained by expanding the second area B by a prescribed width is defined, and the area of the defined travelable area C that does not overlap the virtual second area B' can be deleted. The same effect as (8) can be obtained in this case as well.

The vehicle travel control method and the vehicle travel control device of the present invention were described above based on the first and second embodiments, but specific configurations thereof are not limited to these embodiments, and various design modifications and additions can be made without departing from the scope of the invention according to each claim of the Claims.

In the first and second embodiments, a scanning laser radar and a millimeter wave radar were given as examples of the object detection sensor 21. However, the object detection sensor 21 is not limited thereto. For example, the object detection sensor may be a sensor that detects an object based on an image in front of the vehicle captured by means of a camera.

The invention claimed is:

1. A vehicle travel control method for controlling a host vehicle after a new vehicle cuts in by repeatedly executing a process loop, the vehicle travel control method comprising:
   detecting a first preceding vehicle;
   calculating a previous host vehicle travelable area between the host vehicle and the first preceding vehicle;
   detecting a new preceding vehicle cutting in between the host vehicle and the first preceding vehicle;
   calculating a first area between the host vehicle and the new preceding vehicle, the first area corresponding to a trajectory actually traveled by the new preceding vehicle between a current position of the host vehicle and a current position of the new preceding vehicle;
   setting the previous host vehicle travelable area as a second area;
   defining a current travelable area by adding the first area and the second area;
   generating a target travel trajectory of the host vehicle within the current host vehicle travelable area; and
   controlling the host vehicle along the generated target travel trajectory so as to follow the new preceding vehicle.

2. The vehicle travel control method according to claim 1, wherein
   the target travel trajectory is generated in a central region within the current host vehicle travelable area.

3. The vehicle travel control method according to claim 1, further comprising
   defining a compensated host vehicle travelable area by adding a compensating portion that compensates for an inner corner portion created by the defining of the current host vehicle travelable area, and
   the generating of the target travel trajectory is generated within the compensated host vehicle travelable area.

4. The vehicle travel control method according to claim 3, wherein
   the defining the compensated host vehicle travelable area is performed such that an angle formed between a boundary line of the compensating portion and a boundary line adjacent the compensating portion becomes shallower as a vehicle speed of the host vehicle increases.

5. The vehicle travel control method according to claim 1 further comprising
   defining a risk potential with respect to obstacles detected in a vicinity of the host vehicle based on boundaries in the current host vehicle travelable area in a vehicle width direction of the host vehicle, and
   setting a path in which the risk potential becomes smallest is set as the target travel trajectory.

6. The vehicle travel control method according to claim 5, wherein
   the risk potential is defined using a quadratic function, a potential value at the boundaries in the vehicle width direction is set to 1, and a risk potential value at a center with respect to the vehicle width direction is set to 0.

7. The vehicle travel control method according to claim 5, wherein
   the risk potential is defined using a quadratic function, and the path with which the risk potential becomes smallest is determined based on a least squares method.

8. The vehicle travel control method according to claim 1 further comprising
   defining a virtual second area obtained by expanding the second area in a vehicle width direction by a prescribed width, and
   adding only a portion of the first area that overlaps the virtual second area to the second area to define the current host vehicle travelable area.

9. The vehicle travel control method according to claim 1 further comprising defining a virtual second area obtained by expanding the second area in a vehicle width direction by a prescribed width, and deleting an area of the current host vehicle travelable area that does not overlap the virtual second area.

10. A vehicle travel control device comprising:

a controller configured to control a host vehicle after a new vehicle cuts in by repeatedly executing a process loop, the process loop comprising:

detecting a preceding vehicle;

calculating a previous host vehicle travelable area between the host vehicle and the first preceding vehicle;

detecting a new preceding vehicle cutting in between the host vehicle and the first preceding vehicle;

calculating a first area between the host vehicle and the new preceding vehicle, the first area corresponding to a trajectory actually traveled by the new preceding vehicle between a current position of the host vehicle and a current position of the new preceding vehicle;

setting the previous host vehicle travelable area as a second area;

defining a current host vehicle travelable area by adding the first area and the second area;

generating a target travel trajectory of the host vehicle within the current host vehicle travelable area; and controlling the host vehicle along the generated target travel trajectory so as to follow the new preceding vehicle.

* * * * *